United States Patent [19]

Maiwald

[11] Patent Number: 4,733,845

[45] Date of Patent: Mar. 29, 1988

[54] LOCKABLE SLIDING RAIL GUIDE ARRANGEMENT FOR MOUNTING A SEAT

[75] Inventor: Reinhard Maiwald, Sulzbach-Rosenberg, Fed. Rep. of Germany

[73] Assignee: Grammer Sitzsysteme GmbH, Fed. Rep. of Germany

[21] Appl. No.: 902,623

[22] Filed: Sep. 2, 1986

[30] Foreign Application Priority Data

Sep. 11, 1985 [DE] Fed. Rep. of Germany ....... 3532419

[51] Int. Cl.4 ............................................. F16M 13/00
[52] U.S. Cl. .................................... 248/429; 248/420; 248/430; 297/341
[58] Field of Search ............... 248/429, 424, 430, 420; 297/341; 296/65 R

[56] References Cited

U.S. PATENT DOCUMENTS

| | | | |
|---|---|---|---|
| 3,811,726 | 5/1974 | Muraishi et al. | 297/341 |
| 3,853,298 | 12/1974 | Libkie et al. | 248/429 |
| 4,169,574 | 10/1979 | Garvey et al. | 248/429 |
| 4,210,303 | 7/1980 | Torta et al. | 248/429 |
| 4,262,963 | 4/1981 | Bauer et al. | 248/429 X |
| 4,530,540 | 7/1985 | Hayden et al. | 248/430 X |
| 4,565,344 | 1/1986 | Iwami | 248/429 |
| 4,568,054 | 2/1986 | Degremont | 248/429 |

*Primary Examiner*—Ramon O. Ramirez
*Attorney, Agent, or Firm*—R. Gale Rhodes, Jr.

[57] ABSTRACT

A sliding rail guide arrangement having a locking device for a vehicle seat comprises an outer rail of C-shaped configuration and an inner rail guided displaceably in the outer rail. The locking device comprises a locking lever which is mounted on a mounting member carried on the outside of the outer rail, and the lever carries a locking portion to lock the inner rail with respect to the outer rail. The locking portion, in the locking position, extends through an access aperture in the outer rail and engages into a respective selected locking opening in the inner rail.

4 Claims, 9 Drawing Figures

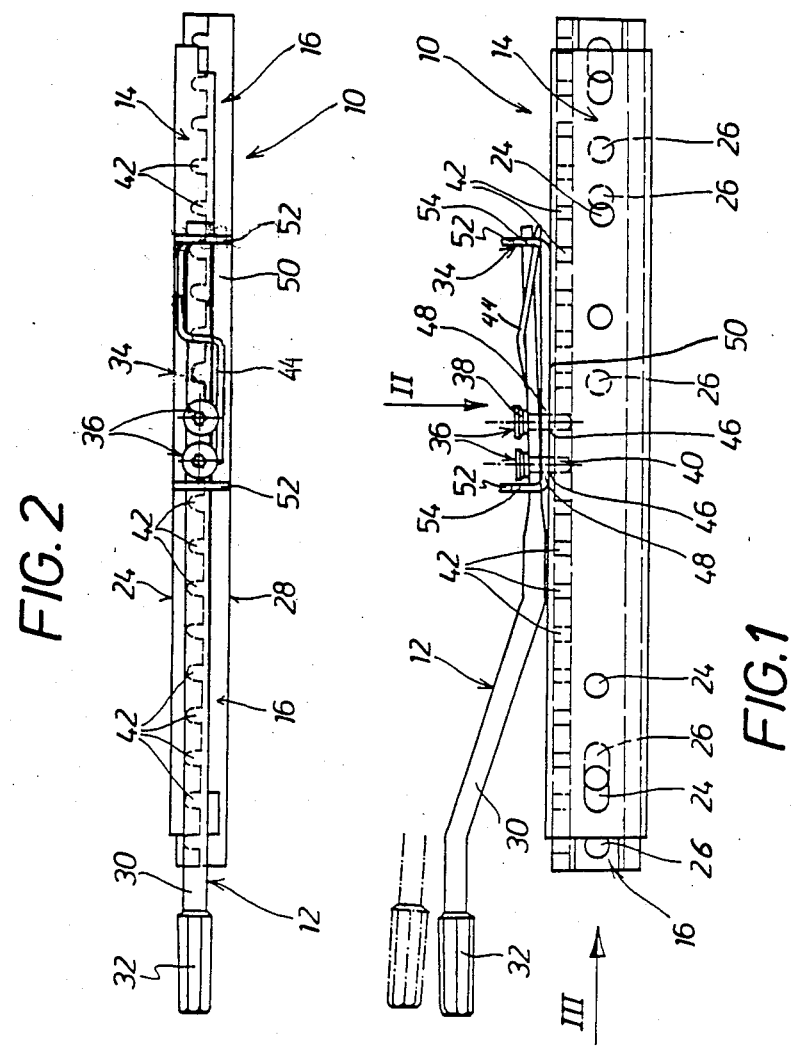

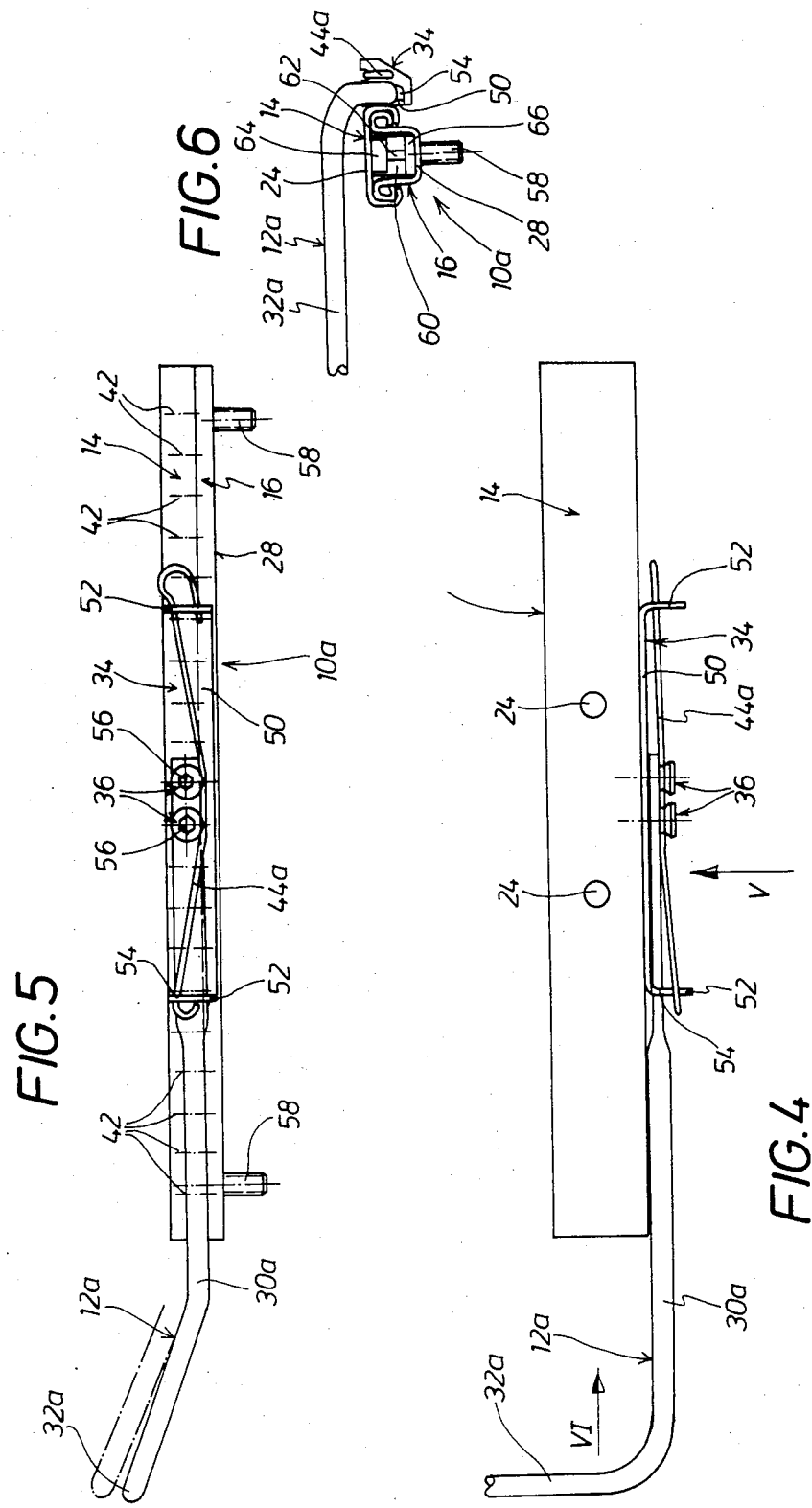

LOCKABLE SLIDING RAIL GUIDE ARRANGEMENT FOR MOUNTING A SEAT

BACKGROUND OF THE INVENTION

Various forms of support arrangements are used for mounting in particular a motor vehicle seat on a mounting surface such as the floor of a motor vehicle body. Such support arrangements include means for adjustment of the seat in the fore-and-aft direction thereof, to provide variations in leg room for passengers and extension of the legs on the part of the driver when actuating foot-operated controls. In one form of such a support arrangement, as disclosed in German laid-open application (DE-OS) No. 25 26 018, the arrangement comprises an outer rail of C-shaped configuration and an inner rail which is slidably mounted therein. The arrangement includes a locking device for locking the inner and outer rails relative to each other, including a retaining lever having a locking member thereon, which engages into an opening in the support arrangement to lock the rails together. The lever has a spring member urging it towards the locked position and is carried pivotably in a mounting member which is disposed in the interior of the inner rail. The locking openings for receiving the locking member on the lever are provided in the outer rail.

However, as the mounting member for carrying the lever is disposed in the interior of the inner rail, the lever has to be fitted into the interior of the rail through an opening provided for that purpose in the rail, and then mounted to the mounting member in the rail. The fact that the lever can only be assembled by being fitted into the inner rail through the above-mentioned opening means that assembly of the arrangement involves a considerable amount of time which in turn has an adverse effect on the costs of production of that arrangement. In addition, any repair to the locking assembly or any replacement of a component thereof becomes a complicated process by virtue of the lever and the mounting member therefor being disposed within the inner rail.

SUMMARY OF THE INVENTION

An object of the present invention is to provide a sliding rail guide arrangement for a vehicle seat, which does not suffer from disadvantages of the above-discussed prior-art arrangements.

Another object of the present invention is to provide a sliding rail guide arrangement with locking device for a vehicle seat, which is of a simple construction and which can be easily assembled.

Yet another object of the present invention is to provide a vehicle seat sliding rail support arrangement which can be easily combined with different kinds of locking levers.

A further object of the present invention is to provide a vehicle seat sliding rail guide arrangement including a locking device which affords the possibility of using a variety of locking levers which are operable in different directions and in different actuating modes.

Still a further object of the present invention is to provide a seat with an adjustable support arrangement having a locking device which is so designed as to permit the locking movement to be readily adapted to the respective particular conditions of installation of the arrangement.

A yet further object of the present invention is to provide a sliding rail guide arrangement for a motor vehicle seat, having a locking device which provides for reduced manufacturing costs while affording versatility of installation.

In accordance with the principles of the present invention, these and other objects are achieved by a sliding rail guide arrangement with locking device, for a vehicle seat, which comprises an outer rail of substantially C-shaped configuration and an inner rail slidably guided in the outer rail. The outer rail carries a mounting means which mounts an actuating lever which is movable relative thereto between a first position of the locking device in which the inner and outer rails are locked relative to each other in a set position of the seat and a second position in which the rails are movable relative to each other by relative sliding movement thereof. In the region of the mounting means for the lever, the outer rail has at least one aperture and the lever carries at least one locking portion thereon, which is arranged to extend through the aperture in the outer rail, at least in the first position of the locking device. The inner rail has a plurality of locking openings adapted selectively to receive the locking portion on the lever, in the set position of the seat. Thus, in the locked position of the arrangement, the locking portion on the lever extends through the aperture in the outer rail and into a respective one of the locking openings in the inner rail, to lock the two rails relative to each other. The arrangement further includes a spring means urging the lever towards the locking position of the arrangement.

The fact that the mounting member for the lever is disposed on the outside of the outer rail means that the lever can be easily fitted to the mounting member, due to the easy access thereof, while in addition the arrangement according to the invention has the advantage that the mounting member which projects laterally from the outside of the outer rail can be combined with a range of different levers, for example levers which are pivotable in different directions in space, for actuation of the locking device. In accordance with the invention therefore, it is possible for the lever of the locking device to be pivoted upwardly, towards the side, or about a pivot axis which extends parallel to the longitudinal direction of the rails, thereby to release the lock between the outer rail and the inner rail disposed therein. When the lever is released in the unlocked position thereof, the lever is returned to the locking position of the locking device by means of the spring, whereupon, when the inner and other rails are in a suitable relationship relative to each other, the locking member on the lever will engage into one of the locking openings in the inner rail, by extending through the aperture in the outer rail.

The arrangement according to the invention is of a simple construction and, as indicated above, in particular can be combined with levers which are to be actuated in different ways. The simplicity of structure of the arrangement according to the invention means that, not only is assembly thereof facilitated but storage of the components required to make up the seat support arrangement with locking device is also facilitated because virtually the same components, in particular the mounting members for the levers, can be used for making up the various locking devices which are intended to be actuated in different ways, as by movement of the actuating lever in different directions.

In an advantageous embodiment of the arrangement according to the present invention, the outer rail is of a cross-sectional configuraton such as to provide substantially C-shaped end portions on that configuration, while the inner rail is of a cross-sectional configuration such as to provide sliding guide portions which are embraced by the above-mentioned C-shaped portions of the outer rail configuration. The locking openings of the inner rail are provided in one of the two sliding guide portions of the inner rail, while the at least one aperture in the outer rail, for the locking portion to extend therethrough, is provided in the C-shaped end portion of the outer rail which is towards the locking openings in the inner rail. The mounting member for mounting the lever is disposed in the direct vicinity of the aperture in the C-shaped end portion of the outer rail. That construction according to the invention gives the further advantage that the aperture in the outer rail, for receiving the locking portion on the lever, is covered by the mounting member as the mounting member is disposed in the direct vicinity thereof, thus giving a very high level of operating reliability due to the protection effect afforded by the mounting member. Furthermore, the positioning of the mounting member at the location compensates for the reduction in mechanical strength of the outer rail, which may occur due to the provision of the aperture therein. The mounting member may indeed even increase the strength of the outer rail in that area, to a higher level than the strength of the rail in its original condition, that is to say, without the aperture therein. The fact that the provision of the mounting member on the outer rail compensates for the reduction in the mechanical strength of the rail or even enhances its mechanical strength is a matter of particular significance when consideration is given to the mechanical deceleration forces which may act on a vehicle seat support arrangement, for example in the event of an accident resulting in vehicle impact.

In a preferred embodiment of the arrangement according to the principles of this invention, the mounting member may be of a loop-like configuration comprising a base portion which is mounted to the outer rail, and first and second side limb portions which are disposed at respective ends of the base portion and which project away therefrom in the same direction, for example at least substantially at a right angle to the base portion. The lever is mounted in the mounting member by extending through an opening provided in at least one of the side limb portions. The base portion has an aperture which is at least substantially aligned with the at least one aperture in the C-shaped end portion of the cross-sectional configuration of the outer rail, so that the locking portion on the lever, in the locked condition of the locking device, can extend through the opening in the base portion of the mounting member and through the aligned aperture in the outer rail, to engage into a selected one of the openings in the inner rail.

Such a construction gives the advantage that the lever can be mounted to the mounting member in a simple manner, which thus cuts down on the assembly time required. The number of openings in the base portion of the mounting member corresponds to the number of apertures in the outer rail, where the outer rail has a plurality of such apertures, as is possible in accordance with the invention. The lever which is mounted in the at least one opening in the mounting member can be displaced in one direction in space to such an extent that the at least one locking member or portion on the lever is disengaged from the respective opening in the inner rail whereby the inner rail can be displaced by a sliding movement relative to the outer rail which embraces it. When the lever is moved into the unlocking position in that fashion, the spring means acting on the lever is mechanically stressed so that when the lever is released again, the spring means returns it to the locking position. Arranging the mounting member in the vicinity of the locking openings in the inner rail means that the lever only needs to be displaced by a relatively small amount to release the locking action as between the inner and outer rails, thus giving an enhanced level of operator comfort and convenience.

In another embodiment of the arrangement according to the invention, the lever is mounted in the openings in both of the side limb portions of the mounting members, by means of the spring, in such a way that the lever is pivotable laterally away from the rails, with the spring means being mechanically stressed upon such movement of the lever into the unlocking position thereof.

In another embodiment of the arrangement of the invention, the lever is mounted in an opening in one of the two side limb portions of the mounting member, by means of the spring, in such a way that the lever is pivotable in a vertical direction laterally beside the rails, on moving between the first and second positions of the locking device, with the spring being mechanically stressed when the lever is moved into the unlocking position. With that construction, when a vehicle seat has two sliding rail guide arrangements according to the invention, which extend in juxtaposed parallel relationship, it is possible for each of the sliding rail guide arrangements to be provided with its respective lever, with the levers being connected together at their ends which are towards the front side of the seat. The fact that the ends of the two levers are connected together as by a transverse bar portion means that it is an easy matter to adjust the seat insofar as the bar portion provides an actuating handle which thus extends over at least substantially the entire width of the seat. Not only does that facilitate operation of the locking device but it also doubles the mechanical strength of the locking action in that both rail assemblies have a respective locking device associated therewith and operable jointly for adjustment of the seat.

In yet another embodiment of the arrangement in accordance with this invention, the lever is mounted in the openings in both of the side limb portions of the mounting member, by means of the spring, in such a way that the lever is pivotable about its longitudinal axis which extends in parallel relationship to the longitudinal direction of the inner and outer rails. The spring is put under mechanical stress when the lever is moved from the locking position of the arrangement into the unlocking position thereof.

It will be seen from the foregoing that the arrangement of the invention requires only one form of mounting member for mounting the actuating lever, irrespective of whether the lever is mounted therein in such a way as to be pivotable laterally away from the rails, pivotable in a vertical plane laterally beside the rails or pivotable about a longitudinal axis extending parallel to that of the rails. The only modifications required in those various assemblies are on the lever itself.

In a desirable embodiment of the present invention, the lever has first and second locking portions thereon, which are disposed at a spacing from each other which corresponds to the spacing between each two adjacent locking openings in the inner rail. The outer rail and the above-mentioned base portion of the mounting member for carrying the lever each have first and second openings, with the respective first openings being aligned with each other and the respective second openings also being aligned with each other, with the spacing between the first and second openings corresponding to the spacing between the locking portions on the lever. The provision of first and second spaced-apart locking portions on the lever means that the mechanical strength of the locking components for locking the inner and outer rails relative to each other, and thus the operational reliability of the arrangement, are substantially increased. The locking portions may be in the form of screw members which are screwed through the locking lever and suitably fixed in position thereon. Such a configuration gives the advantage that the locking portions can be easily replaced by fresh locking portions, for example in order to eliminate wear which has occurred after the arrangement has been in use for a prolonged period of time or to replace locking portions which may possibly have suffered damage as in the case of an accident.

The lever is preferably fixed in position in the mounting member thereof, by means of the spring, with the spring being fixed to the mounting member. In the preferred embodiment of the invention, the spring is not for example a coil spring which takes up a comparatively large amount of space, but is in the form of a resilient clasp-like component, thereby being operable not only to bias the lever towards the locking position of the arrangement but also being effective to hold the lever in place in the mounting member. The configuration of the spring depends on the direction in which the lever of the locking device is moved to release the locking action as between the inner and outer rails.

Further objects, features and advantages of the arrangement according to the teachings of the present invention will become more clearly apparent from the following description of preferred embodiments thereof.

BRIEF DESCRIPTION OF THE DRAWINGS

FIG. 1 is a plan view of a first embodiment of a sliding rail guide arrangement with locking device for a motor vehicle seat, having a locking lever which is pivotable towards the side, FIG. 2 is a side view of the arrangement shown in FIG. 1, viewing in the direction indicated by the arrow II in FIG. 1, FIG. 3 is a front view of the arrangement shown in FIG. 1, viewing in the direction indicated by the arrow III in FIG. 1, FIG. 4 is a view corresponding to FIG. 1 of a second embodiment of the sliding rail guide arrangement in which the lever is pivotable in a vertical direction, FIG. 5 shows the arrangement of FIG. 4, viewing in the direction indicated by the arrow V in FIG. 4, FIG. 6 is a front view of the arrangement shown in FIGS. 4 and 5, viewing in the direction indicated by the arrow VI in FIG. 4.

DESCRIPTION OF PREFERRED EMBODIMENTS

Figure 9:
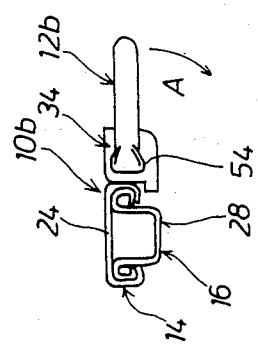
FIG. 9 is a front view of the arrangement shown in FIGS. 7 and 8, viewing in the direction indicated by the arrow IX in FIG. 7.

Reference will first be made to FIGS. 1 through 3 showing a first embodiment of a sliding rail guide arrangement 10 in accordance with the invention, as for a motor vehicle seat. The arrangement 10 according to the invention has a locking device indicated generally by reference numeral 12, for securing the seat on which the arrangement 10 is used in respective ones of a plurality of set positions.

The arrangement 10 according to the invention comprises an outer rail 14 which is of a substantially C-shaped cross-sectional configuration and which in use is mounted for example to the frame of a vehicle seat or to a mounting surface (not shown), and an inner rail 16 which is embraced by and guided slidably in the outer rail 14 in the longitudinal direction thereof and which in use is mounted to the above-mentioned mounting surface or a seat frame portion respectively.

As can best be seen from FIG. 3, the outer rail 14 has a flat-surface base portion 18 and two mutually oppositely disposed end portions 20A and 20B which are each of a substantially C-shaped cross-sectional configuration. The end portions 20A and 20B of the outer rail 14 embrace sliding guide portions 22 provided by the cross-sectional configuration of the inner rail 16, as is also shown in FIG. 3. Reference numerals 24 and 26 denote openings in the base portion of the C-shaped outer rail 14 and the base portion 28 of the inner rail 16.

Referring still to FIGS. 1 through 3, the locking device 12 comprises a locking or actuating lever 30 having an actuating handle 32 on an end portion thereof, and a mounting member 34 through which a part of the lever 30 extends in a manner which will be described in greater detail hereinafter. The lever 30 carries at least one and, as illustrated, two, locking portions 36. Each locking portion 36 is illustrated in the form of a screw member having a screw head 38, a screwthreaded shoulder portion which is screwed into the lever 30 for mounting the respective locking portion 36 therein, and a projecting portion 40 which is the locking condition of the arrangement 10 is engaged into a respective locking opening 42 in the inner rail 16. So that the locking portions 36 reliably engage into the respective selected openings 42 in the inner rail 16 at all times, thereby to produce a secure locking action as between the inner and outer rails 16 and 14, the locking device 12 further includes a spring 44 which extends around the lever 30 in the configuration which can be clearly seen from FIGS. 1 and 2 and which is secured to the mounting member 34 of the locking device 12. The spring 44 thus biases the lever 30 towards the position in which the locking portions 36 are engaged into the respective selected locking openings 42 in the inner rail 16. The locking position of the lever 30 is shown in solid lines in FIG. 3, while the dash-dotted lines show the lever 30 in a release position of the locking device 12.

As can be seen in particular from FIGS. 1 and 3, the mounting member 34 is secured to one of the above-mentioned C-shaped end portions 20 of the outer rail 14.

The mounting member 34 is preferably secured to the outer rail 14 by welding.

As shown in FIG. 1, the outer rail 14 further has first and second apertures 46 therein, which are so positioned relative to the mounting member 34 and the lever 30 that, in the locking condition of the device 12, the locking portions 36 on the lever 30 extend through the apertures 46 in the outer rail so as to be capable of engaging into the locking openings 42 in the inner rail 16. The mounting member 34 has apertures 48 which are disposed in alignment with the respective apertures 46 in the outer rail, so that the locking portions 36 thus also extend through the apertures 48 in the mounting member in order to engage into the locking openings 42 in the inner rail 16. It should be noted that the locking portions 36 on the lever 30 extend through the apertures 48 in the mounting member 34 at all times, that is to say, including in the unlocking condition of the device 12.

As can be clearly seen from FIG. 1, the mounting member 34 is of a loop-like or generally U-shaped configuration, comprising a base portion 50 and two side limb portions 52 which project away from the base portion 50 in the same direction at respective ends thereof, preferably being at a right angle to the base portion 50. Each of the limb portions 52 has an opening 54 therein, and a part of the lever 30 extends through the openings 54 and is mounted therein. In the illustrated embodiment of the arrangement 10, the mounting member 34 is secured by means of the base portion 50 thereof to a longitudinally extending outside surface portion of the outer rail 14. That configuration can be clearly seen for example from FIGS. 1 and 3.

In the embodiment of the arrangement according to the invention as shown in FIGS. 1 through 3, the lever 30 is mounted in the mounting member 34 in such a way as to be pivotable in a horizontal plane laterally of the arrangement 10, in other words, when the lever 30 is moved from the locking condition of the arrangement into the unlocking condition, it is pivoted horizontally away from the rails 14 and 16. The return movement of the lever 30 into the locking condition of the arrangement 10 is also horizontal, towards the rails 14 and 16. In the unlocking position of the lever 30, which as mentioned is indicated by the dash-dotted lines in FIG. 1, the lever 30 is urged mechanically by the spring 44 towards its locking condition so that, when the actuating handle 32 of the lever 30 is released, the lever 30 returns to the locking position shown in solid lines in FIGS. 1 through 3.

Reference will now be made to FIGS. 4 through 6 showing another embodiment of a sliding rail guide arrangement according to the invention, as indicated generally at 10a, with a locking device 12a, an outer rail 14 of substantially C-shaped configuration and an inner rail 16 guided slidably in the outer rail 14. The inner and outer rails 16 and 14 respectively correspond to the rails shown in FIGS. 1 through 3 and are thus denoted by the same reference numerals. Likewise, other components which are the same in FIGS. 4 through 6 as those shown in FIGS. 1 through 3 are also denoted by the same reference numerals and will not be described again in full detail at this point.

The locking device 12a comprises a locking or actuating lever 30a which, as can be clearly seen from FIGS. 4 through 6, is of a different configuration from that used in the first embodiment, and a mounting member 34 which is the same as the mounting member of the first embodiment. Once again, the mounting member 34 is of a generally U-shaped configuration comprising a base portion 50 and side limb portions 52 which extend away from the base portion 50 in the same direction at respective ends thereof. The end portion 52 which is shown at the left-hand side in FIGS. 4 and 5 has an opening 54 through which a part of the lever 30a extends. The lever 30a is again provided with first and second locking portions 36, as described in greater detail with reference to FIGS. 1 through 3. As in that embodiment, the locking members 36 have hexagonal blind holes 56 in the screw heads thereof, by means of which the locking portions 36 can be screwed fixedly into position on the lever 30a.

Disposed between the end limb portions 52 of the mounting member 34 is a clip-like spring 44a, the configuration of which can be most clearly seen from FIG. 5. In the locking condition of the device 12a, the locking portions 36 on the lever 30a bear against the spring 44a, at a position intermediate the hooked ends thereof. Thus, the force of the spring 44a urges the locking portions 36 upwardly as viewed in FIG. 5, whereby the lever 30a is urged pivotally in a counter-clockwise direction in FIG. 5, about the pivot mounting point formed by the co-operation of the lever 30a with the opening 54 in the limb portion 52, through which the lever 30a extends. The spring 44a thereby urges the lever 30a towards the locking position as shown in solid lines in FIG. 5. From the locking condition of the locking device 12a, the lever 30a is moved upwardly in a vertical direction, laterally beside the assembly of the inner and outer rails 16 and 14. The release position of the lever 30a, in which therefore it has been pivoted vertically upwardly, is shown in FIG. 5 by the dash-dotted line representation of the actuating handle portion 32a of the lever 30a. When the lever 30a moves upwardly as indicated above, the lever 30a is thus pivoted about its pivot mounting point formed by the co-operation between the lever 30a and the side surfaces defining the opening 54 in the limb portion 52 of the mounting member 34, in such a way that the locking portions 36 bear against the spring 44a so that the spring 44a is put under a mechanical prestress. When the actuating handle 32a of the lever 30a is released the spring 44a is relieved of stress by urging the locking portions 36 upwardly in FIG. 5 so that the lever 30a returns to the locking position in which the locking portions 36 extend through apertures in the mounting member 34 and the outer rail 14 into first and second selected adjacent locking openings provided in the inner rail 16. The locking openings in the inner rail 16 are indicated at 42 in FIGS. 4 and 5 in diagrammatic form by means of dash-dotted lines which extend in juxtaposed parallel relationship and which are equally spaced from each other. The spacing between adjacent openings 42 corresponds to the centre-to-centre spacing of the locking portions 36.

In FIGS. 4 through 6, reference numeral 24 denotes openings in the outer rail by means of which for example the outer rail can be secured to the underside of a seat plate portion of a vehicle seat. Reference numeral 58 in FIGS. 5 and 6 denotes projection elements which have a male screwthread thereon and which are fixed to the base portion 28 of the inner rail 16. The elements 58 are provided for example for screwing the inner rail 16 in position on the floor plate portion of a vehicle.

The guide arrangement 10a shown in FIGS. 4 through 6 is provided with rollers as indicated diagrammatically at 60 in FIG. 6, which are disposed with their cylindrical peripheral surfaces between the base portion 24 of the outer rail 14 and the base portion 28 of the inner rail 16. In order to reduce the amount of noise generated when sliding movement between the outer rail 14 and the inner rail 16 occurs, the rollers 60 are provided at their peripheral surface with a peripherally extending recess in which a respective O-ring 62 is fitted. Reference numerals 64 and 66 in FIG. 6 denote abutment bar members which are provided to prevent the rollers 60 from coming out of the rail arrangement 10a.

It will be noted at this point that in the embodiment illustrated in FIGS. 4 through 6, the lever 30a is mounted in a mounting member which is of the same configuration as that used in the embodiment shown in FIGS. 1 through 3, and the lever is pivotable in a vertical direction laterally beside the outer rail 14.

Figure 8:
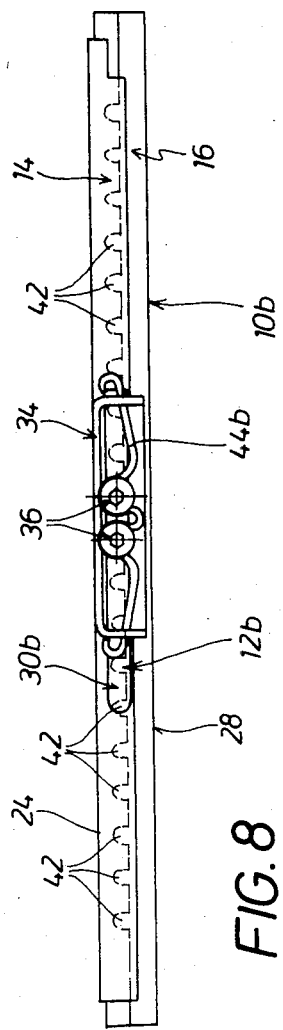
FIG. 8 is a side view of the arrangement shown in FIG. 7, viewing in the direction indicated by the arrow VIII in FIG. 7.
Figure 7:
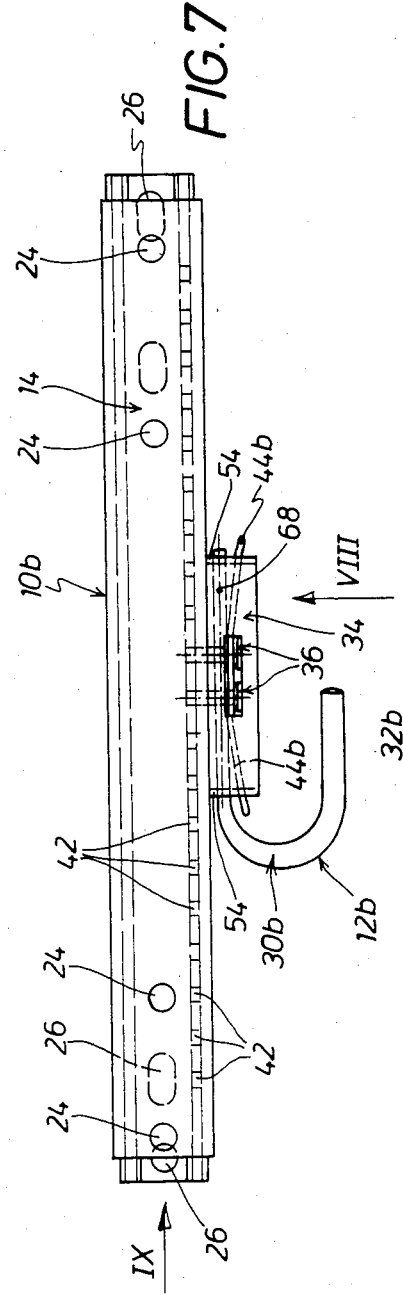
FIG. 7 is a view corresponding to that shown in FIG. 1 of a third embodiment of an arrangement according to the invention in which the lever is pivotable about an axis extending parallel to the longitudinal direction of the rail arrangement.

Reference is now made to FIGS. 7 through 9 showing a third embodiment of a sliding rail guide arrangement 10b having a locking device 12b, for a vehicle seat. The rail arrangement is of the same basic configuration as described above with reference to FIGS. 1 through 3 and FIGS. 4 through 6 respectively, comprising an outer rail 14 embracing an inner rail 16, as can be clearly seen from FIG. 9. In this embodiment, in order to release the locking action of the locking device 12b whereby the outer rail 14 and the inner rail 16 are secured relative to each other in a set adjusted position of the seat, the lever 30b of the locking device 12b is pivoted about its longitudinal axis which extends parallel to the longitudinal axis of the assembly of rails 14 and 16. The longitudinal axis of the lever 30b, about which the lever is pivoted between the locking and unlocking positions, is indicated by reference numeral 68 in FIG. 7. When the lever 30b is pivoted from the locking position into the unlocking position about the axis 68, as indicated by the arrow A in FIG. 9, the spring 44b is mechanically stressed so as to try to move the lever 30b back towards the locking position thereof. For that purpose, the spring 44b which is engaged through openings 54 provided in the respective side limb portions of the mounting member 34 extends beneath and engages against the underside of the locking portions carried on the lever 30b, as can be seen from FIG. 8. When the actuating handle portion 32b of the lever 30b is released when the lever is in the unlocking condition of the locking device 12b, the locking portions 36 carried on the lever 30b extend through suitable apertures in the mounting member 34 and the outer rail 14 and thus engage into locking openings 42 provided in the inner rail 16.

Reference numerals 24 and 26 in FIG. 7 denote apertures or holes which extend through the base portion 24 of the C-shaped outer rail 14 and through the base portion 28 of the inner rail 16. Thus, by means of holes 24 and 26, the rails 14 and 16 respectively may be secured in the position of use of the arrangement, for example to the underside of a vehicle seat frame and to the floor plate of a vehicle respectively.

It will be seen that in this embodiment the actuating lever 30b is moved between the locking and unlocking positions thereof by pivotal movement about a longitudinal axis extending in parallel relationship to the rails 14 and 16, with the spring 44b which is fixed to the mounting member 34 by engagement of end portions of the spring through the openings 54 in the limb portions 52 of the mounting member being stressed when the lever 30b is moved into the unlocking position.

As will be clearly appreciated from the foregoing description and the views shown in FIGS. 1 through 9, with the construction in accordance with the principles of the present invention, it is readily possible for locking devices 12, 12a and 12b respectively, which are each to be actuated in a different fashion, to be disposed on respective rail arrangements 10, 10a and 10b, which are each of the same basic construction, thereby simplifying storage of individual components of the assembly, in that it is only necessary to produce and store one form of outer rail and one form of inner rail, for each of the various constructions in which such rails may be used. As the mounting members 34 are also the same or are at least of a very similar design, it is also possible to use the same mounting members for the various forms of locking devices which are actuable in different ways. Furthermore, the arrangement according to the invention has the advantage that the actuating levers are arranged on the outside of the respective guide arrangement 10 in such a way that the costs of assembly of the arrangement when manufacturing same are comparatively low. The springs 44, 44a and 44b in each of the embodiments shown in FIGS. 1 through 3, 4 through 6 and 7 through 9 respectively are also of a simple design and can be fitted in position in a simple quick operation, thus further having a positive effect on the production costs of the arrangement.

It will be appreciated that the above-described embodiments of the arrangement in accordance with the teachings of this invention have been set forth solely by way of example thereof and that further modifications and alterations may be made therein without thereby departing from the spirit and scope of the invention.

What is claimed is:

1. A sliding rail guide arrangement with locking device for a vehicle seat, comprising an outer rail of substantially C-shaped configuration including at least one substantially C-shaped end portion having at lest one aperture formed therein, an inner rail guided in the outer rail slidably therein and having a plurality of locking openings formed therein, a locking lever having at least one locking portion thereon, mounting means including a base portion having first and second ends and first and second limb portions which project away from the respective ends of the base portion in the same direction relative thereto, at least one of said limb portions of said mounting means having a mounting opening therethrough and a portion of said locking lever disposed in said mounting opening for mounting said lever on said mounting means movable relative thereto between a first position in which said inner and outer rails are locked relative to each other and a second position permitting relative sliding movement of said inner and outer rails, said base portion of said mounting means mounted to said outer rail and having at least one aperture aligned with said at least one aperture in said substantially C-shaped end portion of said outer rail and said locking portion on said locking lever positioned to extend through said aperture in said base portion of said mounting means and through said at least one aperture in said outer rail to engage into a respective one of said locking openings formed in said inner rail to lock said inner rail in said outer rail in said first position of said locking lever.

2. An arrangement as set forth in claim 1 wherein each said limb portion of said mounting means has an opening therein and said lever is mounted in said openings, and further including a spring means acting on said lever to urge it towards said first position thereof whereby said lever is pivotable laterally away from said outer rail when it is moved from said first position to said second position, against the force of said spring means.

3. An arrangement as set forth in claim 1 and further including a spring means adapted to mount said lever in a said opening in one of said limb portions of said mounting means whereby said lever is pivotable in a vertical direction laterally beside said outer rail when it is moved between said first and second positions thereof, said spring means urging said lever towards said first position.

4. An arrangement as set forth in claim 1 wherein each said limb portion of said mounting means has an opening therein and further including a spring means adapted to mount said lever in said openings in said limb portions of said mounting means whereby said lever is pivotable about a longitudinal axis thereof extending in parallel relationship to said outer rail, when it moves between said first and second positions thereof, said spring means urging said lever towards said first position thereof.

* * * * *